US007206672B2

(12) United States Patent
Mueller

(10) Patent No.: US 7,206,672 B2
(45) Date of Patent: Apr. 17, 2007

(54) VEHICLE DATA BUS SYSTEM

(75) Inventor: Achim Mueller, Gerlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/962,776

(22) Filed: Oct. 12, 2004

(65) Prior Publication Data

US 2005/0102069 A1 May 12, 2005

(30) Foreign Application Priority Data

Oct. 10, 2003 (DE) ................................ 103 47 836

(51) Int. Cl.
*H04Q 7/20* (2006.01)
*F02D 45/00* (2006.01)

(52) U.S. Cl. ........................... 701/1; 340/989; 455/420

(58) Field of Classification Search .................... 701/1, 701/213; 340/989, 988, 825.49; 342/357.07, 342/357.09, 457; 455/420, 3.01, 3.03, 346, 455/574
See application file for complete search history.

(56) References Cited

U.S. PATENT DOCUMENTS 5,999,876 A * 12/1999 Irons et al. ................. 701/115
6,604,038 B1 * 8/2003 Lesesky et al. ............... 701/49
6,710,738 B2 * 3/2004 Allen, Jr. ................. 342/357.1
6,924,750 B2 * 8/2005 Flick .......................... 340/989
6,947,732 B2 * 9/2005 Fraser ........................ 455/420
2004/0203696 A1 * 10/2004 Jijina et al. ................. 455/420

* cited by examiner

*Primary Examiner*—Dalena Tran
(74) *Attorney, Agent, or Firm*—Akerman & Senterfitt; Stephen A. Pendorf; Yonghong Chen

(57) ABSTRACT

The invention concerns a data bus system (30) including a communication unit (40) for bidirectional wireless communication with at least one unit (20) outside of the vehicle (10) and with vehicle units (50, 60, 70, 72, 74, 76, 78, 80, 90, 110, 120, 130, 140) which are in data transmission communication with the communication unit (40) via at least one data bus (150, 152, 154), wherein data as to status of the vehicle units (50, 60, 70, 72, 74, 76, 78, 80, 90, 110, 120, 130, 140) is transmitted via the at least one data bus (150, 152, 154) to the communication unit (40) and transmittable via the communication unit (40) to at least one unit (20) outside the vehicle. According to the invention, a triggering event (E) is received by the vehicle units (50, 60, 70, 72, 74, 76, 78, 80, 90, 110, 120, 130, 140) via at least one data bus (150, 152, 154), and the vehicle units (50, 60, 70, 72, 74, 76, 78, 80, 90, 110, 120, 130, 140) upon receipt of the triggered event (E) transmit their status data via the at least one data bus (150, 152, 154) to the communication unit (40).

12 Claims, 5 Drawing Sheets

VEHICLE DATA BUS SYSTEM

BACKGROUND OF THE INVENTION

1. Field of Invention

The invention concerns a vehicle data bus system of the type set forth in the precharacterizing portion of Patent Claim 1.

2. Related Art of the Invention

U.S. Pat. No. 6,028,537 describes a vehicle data bus system wherein signals for control of functions of vehicle devices are receivable from a center via a communication device.

SUMMARY OF THE INVENTION

It is the task of the invention to provide an improved vehicle data bus system, via which the energy supply in the vehicle battery can be better utilized.

The invention solves this task by providing a vehicle data bus system having the characteristics of Patent Claim 1.

Advantageous further developments of the invention are set forth in the dependent claims.

It is the basic idea of the invention, that status data is transmitted from bus-networked vehicle devices to the communication device of the vehicle after parking of the vehicle. This concerns in particular all vehicle devices for which status data can be interrogated from outside the vehicle via the communication device.

In a preferred embodiment of the invention the communication device is switched to an inactive mode after a certain period of time following parking of the vehicle, wherein it is no longer available for communication. There is also a (concurrent) second predetermined time interval, after the expiration of which the vehicle devices are switched to a so-called “sleep-mode”, in which the energy requirement of the vehicle devices is reduced in comparison to the normal mode. Preferably, the predetermined time interval is longer than the second predetermined time interval. In the time following conclusion of the second predetermined time interval and prior to completion of the predetermined time interval the communication device is available for communication, the vehicle devices are however already in the “sleep-mode”. In this condition it is particularly advantageous, that the status data of all vehicle devices, of which the status data can be interrogated from outside the vehicle via the communication device, is in memory in the communication device. In the case of an interrogation as to status data (data retrieval) from outside, that is, via the communication device, the communication device can answer the interrogation directly on the basis of the stored status data. No activation of the vehicle bus data system is necessary. This preserves the reserve of energy in the vehicle battery and has the consequence that the vehicle in the parked condition has starting-up energy available for a longer period of time.

BRIEF DESCRIPTION OF THE DRAWINGS

The invention will be now described in greater detail on the basis of the illustrated examples shown in the figures. There is shown.

Corresponding parts in all figures are provided with the same reference numbers.

DETAILED DESCRIPTION OF THE INVENTION

Figure 1:
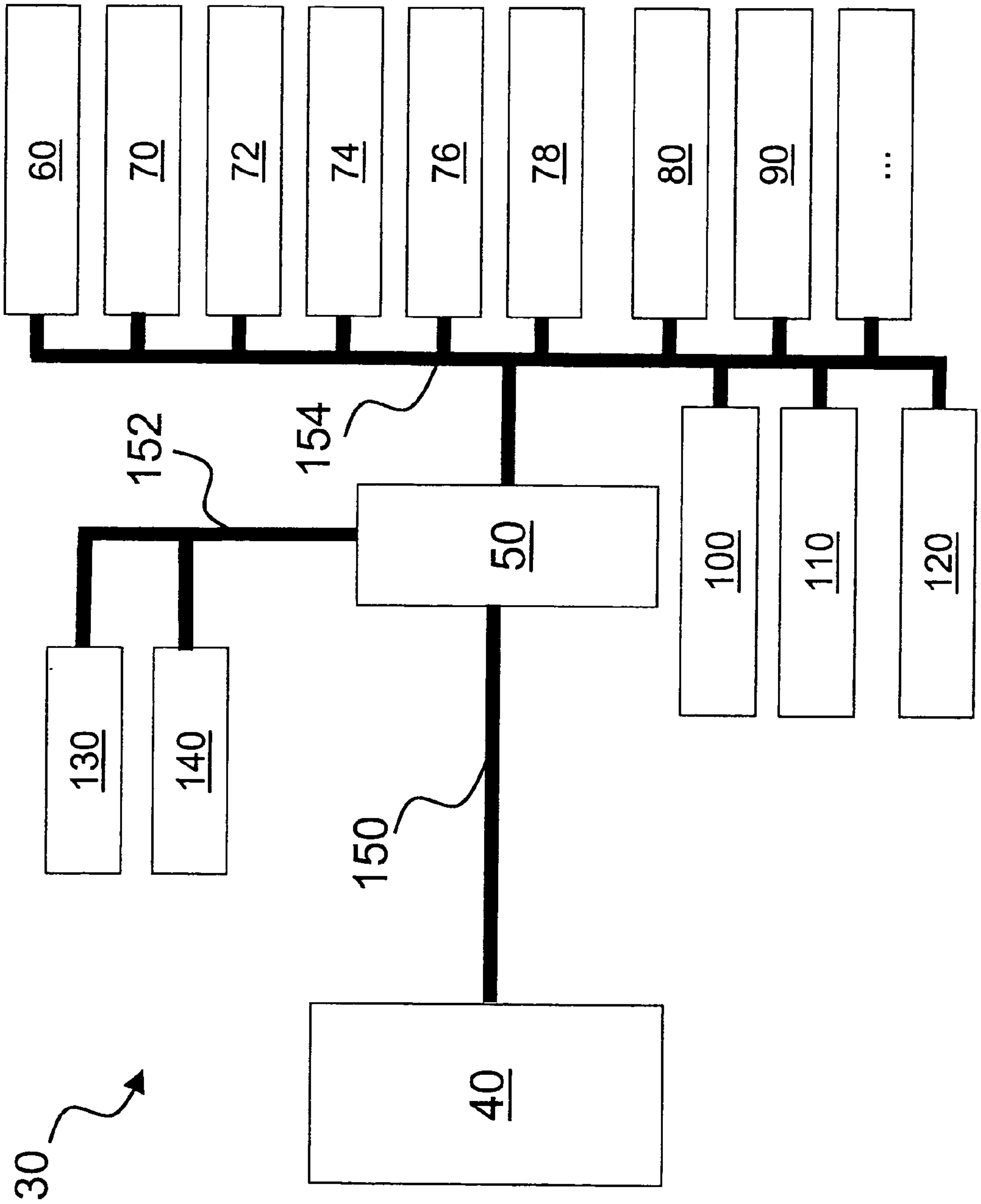
FIG. 1 a schematic representation of the vehicle data bus system.

FIG. 1 shows a schematic representation of a vehicle data bus system 30 with a communication unit 40. The vehicle data bus system 30 shown in FIG. 1 includes a gateway 50, a “keyless go” unit 60, door control devices 70, 72, 74, 76, a signal acquisition and control module 78, an ignition switch control device 80, a roof operating unit 90, a independent vehicle heater 100, a seat heater 110, an energy control device 120, a display and operation unit 130, an instrument cluster (instrument control device) 140 and data buses 150, 152, 154. The data bus 150 is for example a CAN class D bus. The data bus 152 is for example a so-called “backbone”, that is, a data bus with very high data transmission rate. The data bus 154 is for example a CAN class B bus or CAN class C bus. The gateway 50 enables data transmission between the various data buses 150, 152, 154. The units 40, 50, 60, 70, 72, 74, 76, 78, 80, 90, 110, 120, 130, 140 can individually also be connected via discrete lines or circuits and/or be wireless linked. Also conceivable are mixtures of the topologies, discrete connections and/or data buses. It is likewise conceivable to incorporate various units in a single housing. One or more of the data buses can be in the form of, for example, a ring shaped bus, in particular an optical bus such as, for example, D2B (Domestic Digital Bus) or MOST (Media Oriented Systems Transport).

The communication device 40 receives inquires regarding status data from the unit 20, for example the center, via the communication device 25. These interrogations of status data are answered by the vehicle 10 using the actual status data of the vehicle units 50, 60, 70, 72, 74, 76, 78, 80, 90, 110, 120, 130, 140, in that the inquired about status data are transmitted via the communication device 40 to the unit 20.

Besides this, in the vehicle units 50, 60, 70, 72, 74, 76, 78, 80, 90, 110, 120, 130, 140 a number of vehicle functions are controllable via control signals which are received by the communication device 40 from the unit 20, for example, a geographically fixed center. The control signals are transmitted via one or more data buses to the relevant units to be controlled and these carry out the desired actions.

The functions in the vehicle devices 50, 60, 70, 72, 74, 76, 78, 80, 90, 110, 120, 130, 140 include, for example, the locking function for locking of vehicle doors, as well as the trunk lid and the gas fill lid, an independent vehicle heater, as well as air conditioning (climate control), functions for opening and closing windows and the retractable roof, seat heaters, etc. Functions to be carried include for example the opening or closing of windows, the locking of the vehicle, the activation or deactivation of the vehicle independent heater, the deicing of the windshields and/or the ventilation of the vehicle, etc. Besides this, functions to be carried out include the programming of individual functions, for example, programming of a time for activation of the independent vehicle heater, etc.

Figure 2:
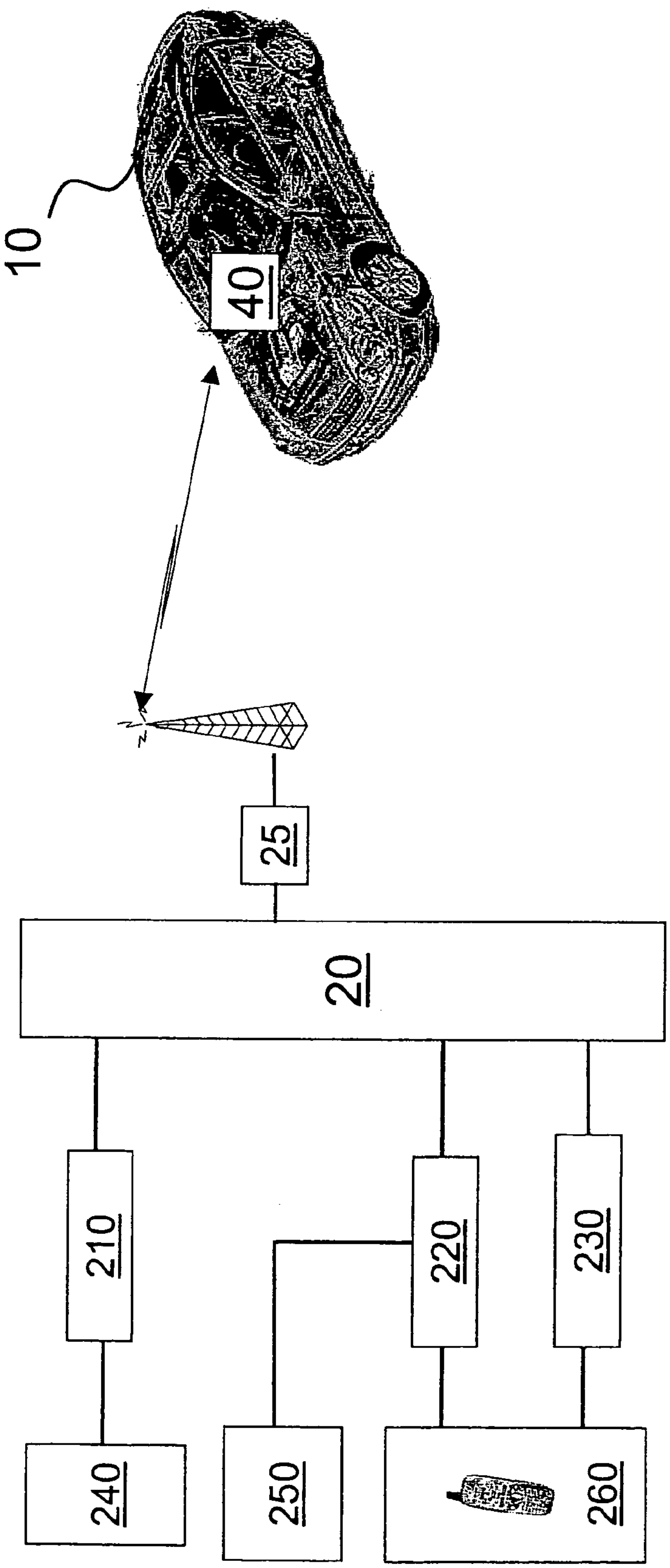
FIG. 2 a schematic representation of a vehicle with a communication link to a unit outside of the vehicle, FIG. 3 a schematic representation of the time sequence illustrating energy management, FIG. 4 a schematic representation of the data exchange relationship, using the example of an independent vehicle heater, FIG. 5 a schematic representation of the data exchange relationship, using the example of a vehicle locking function.

FIG. 2 schematically shows the communication relationship established between a unit 20 and, as an example, a geographically fixed center.

A user obtains access to the computer system of the geographically fixed center 20, for example via the internet 210 using his home computer 240. Alternatively, or additionally, the user can gain access to the unit 20 via a mobile telephone 260 through a mobile internet, for example WAP (Wireless Application Protocol). Following authentication by the unit 20 the user is associated or connected with a specific vehicle 10. Via the internet 210 and/or the mobile internet 230 the user can, following authentication, transmit interrogatories for status of vehicle functions to the unit 20. The unit 20 transmits the request for status data via the communication unit 25 to the vehicle 10. The vehicle 10 receives the status inquiry via the communication unit 40. In response, the communication device 40 transmits the requested status data to the unit 20.

In a preferred embodiment of the invention the user can transmit, following authentication, supplemental control instructions to the unit 20 via the internet 210 and/or the mobile internet 230 for remote control of vehicle functions. The unit 20 transmits the control instructions or commands via the communication unit 25 to the vehicle 10. The vehicle 10 receives the control instructions via the communication unit 40. In a preferred embodiment of the invention, after receipt of the control signals in the vehicle 10 it is checked whether the energy stored in the vehicle battery is sufficient to carry out the requested functions. If sufficient energy remains available in the battery, then the function is carried out and the appropriate response is transmitted via the communication device 40 to the unit 20. If it is determined in the vehicle 10 that the energy reserve in the battery is not sufficient to carry out the requested function and/or the energy reserve following the carrying out of the requested function would lie below a predetermined threshold, then the function is not carried out and an appropriate reply is transmitted via the communication unit 40 to the unit 20.

Figure 3:
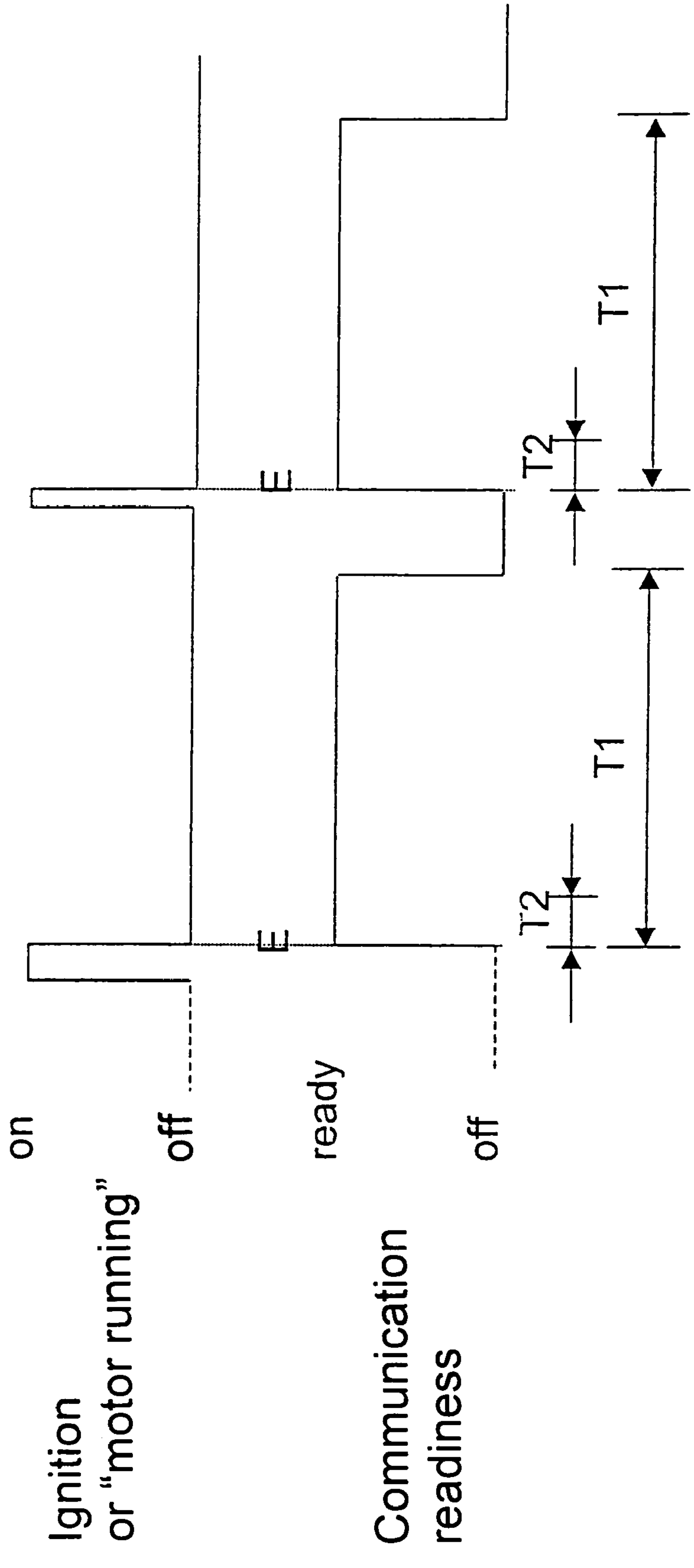

In FIG. 3 a time sequence showing energy management is schematically represented. Following event E "ignition off" the vehicle units 50, 60, 70, 72, 74, 76, 78, 80, 90, 110, 120, 130, 140 transmit their status data to the communication device 40. The communication device 40 then stores the status data received from the vehicle units 50, 60, 70, 72, 74, 76, 78, 80, 90, 110, 120, 130, 140.

As shown in FIG. 3, for a period of time T1 following the event E "ignition off" a follow-up mode for the communication unit 40 is provided. In the follow-up mode the communication unit 40 continues to remain communication-ready. This means for example that the communication unit 40 continues to remain logged in to a cellular mobile radio network. Following conclusion of time interval T1 the communication unit 40 switches itself off. In the switched-off mode the communication device 40 is no longer available for communication, that is, it cannot establish a communication link and it is not possible from outside, for example through unit 20 via communication unit 25, to establish a communication link with the communication unit 40. A remote control of vehicle functions and/or an interrogation of status data of the vehicle by unit 20 is not possible in the switched-off mode of the communication device 40. The energy consumption of the communication device 40 in the follow-up mode is higher than in the switched off mode. If the communication unit 40 is kept continuously ready for communication, then the energy supply in the battery would constantly be expended and eventually the vehicle would not be able to start. This is avoided in that, following conclusion of the time interval T1, the communication unit 40 is deactivated and thereby its energy consumption is minimized. Preferably the communication unit receives the event E "ignition off" as a signal via the one or more data buses 150, 152, 154.

In a preferred embodiment of the invention the vehicle units 50, 60, 70, 72, 74, 76, 78, 80, 90, 110, 120, 130, 140, following conclusion of the time interval T2 after the event E "ignition off", assume a so-called "sleep-mode". This mode is a mode of the units 50, 60, 70, 72, 74, 76, 78, 80, 90, 110, 120, 130, 140, in which energy consumption is reduced in comparison to normal operation. It is also possible thereby to reduce the energy consumption of the vehicle 10, so that the vehicle while parked maintains readiness to start for longer periods of time. Preferably the vehicle units 50, 60, 70, 72, 74, 76, 78, 80, 90, 110, 120, 130, 140 receive the event E "ignition off" as a signal via the one or more data buses 150, 152, 154.

Preferably the vehicle units 50, 60, 70, 72, 74, 76, 78, 80, 90, 110, 120, 130, 140 go into the sleep-mode also after the carrying out of a remote activated vehicle function. This occurs following a third predetermined time interval T3 following the conclusion of the carrying out of that function.

Preferably the transmission of the data regarding the status of the vehicle units 50, 60, 70, 72, 74, 76, 78, 80, 90, 110, 120, 130, 140 occurs prior to the end of time interval T2 following event E. This has the advantage that the receipt of a question regarding status data following conclusion of the time interval T2, however prior to conclusion of time interval T1 after event E, the status data is directly available in the communication unit 40. The communication unit 40 can thus directly answer a question regarding status data, without having to "wakeup" the vehicle data bus system 30 in its entirety together with units 50, 60, 70, 72, 74, 76, 78, 80, 90, 110, 120, 130, 140. This likewise contributes thereto, that the energy supply remaining in the vehicle battery remains available longer in the parked condition of the vehicle 10.

Preferably the communication unit 40 and/or the units 50, 60, 70, 72, 74, 76, 78, 80, 90, 110, 120, 130, 140 can be awakened by a wakeup signal via the one or more data buses 150, 152, 154. Thereby, a waking up of the vehicle data bus system 30 can be ensured, when for example the vehicle 10 is unlocked by a remote control signal from the user and/or the door knob of a vehicle door is operated.

Preferably the time interval T2 is substantially shorter than the time interval T1. Thus, the communication readiness of the communication unit 40 is ensured. This can, as required, for example upon receipt of a control signal for a vehicle function, wake up the units 50, 60, 70, 72, 74, 76, 78, 80, 90, 110, 120, 130, 140 via a wakeup signal via the one or more data buses.

In a further advantageous embodiment of the invention the unit 120 is connected directly with the communication unit 40, so that for a status inquiry regarding the energy supply 124 the entire bus system 3 need not be awakened.

Figure 4:
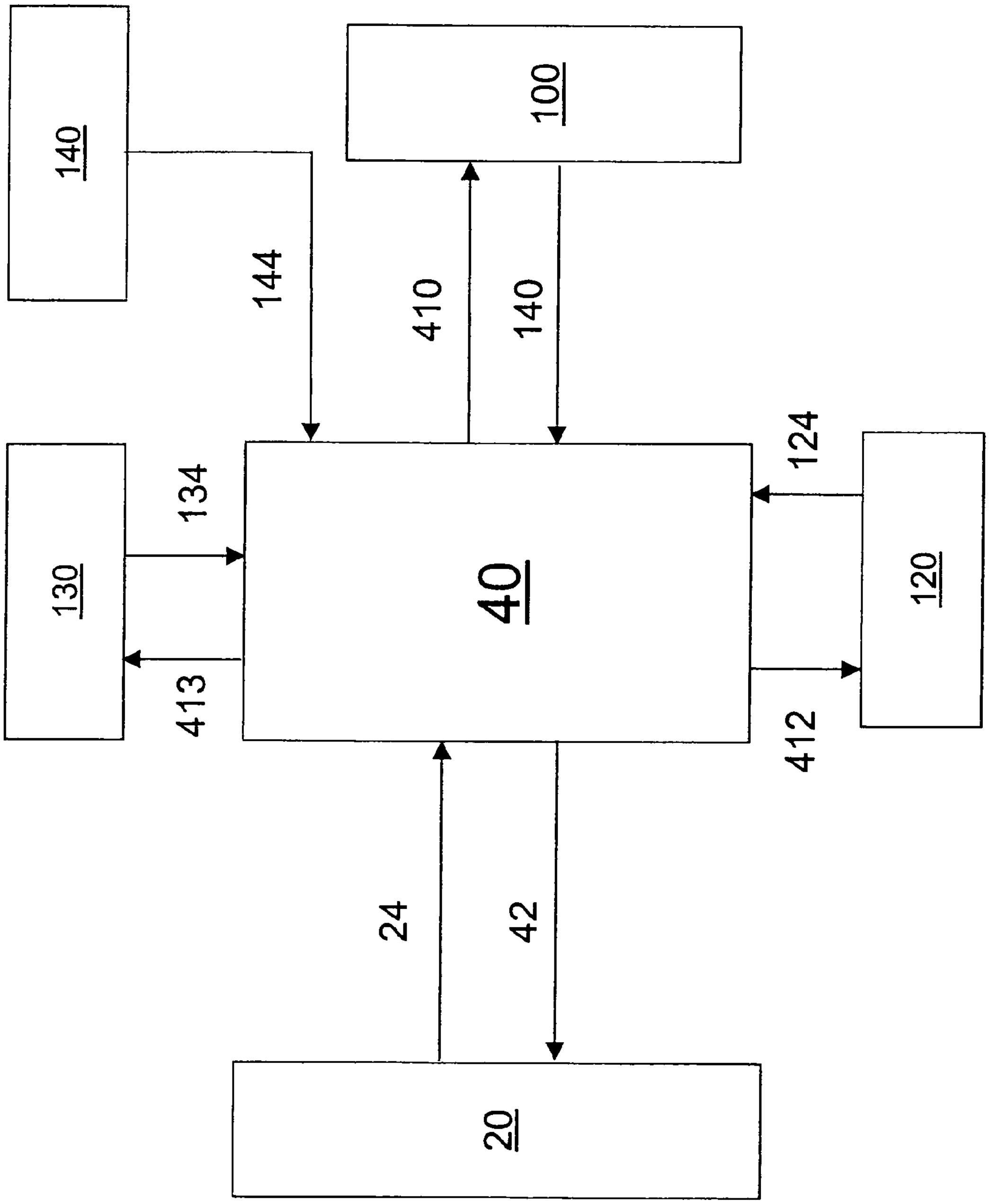
Figure 5:
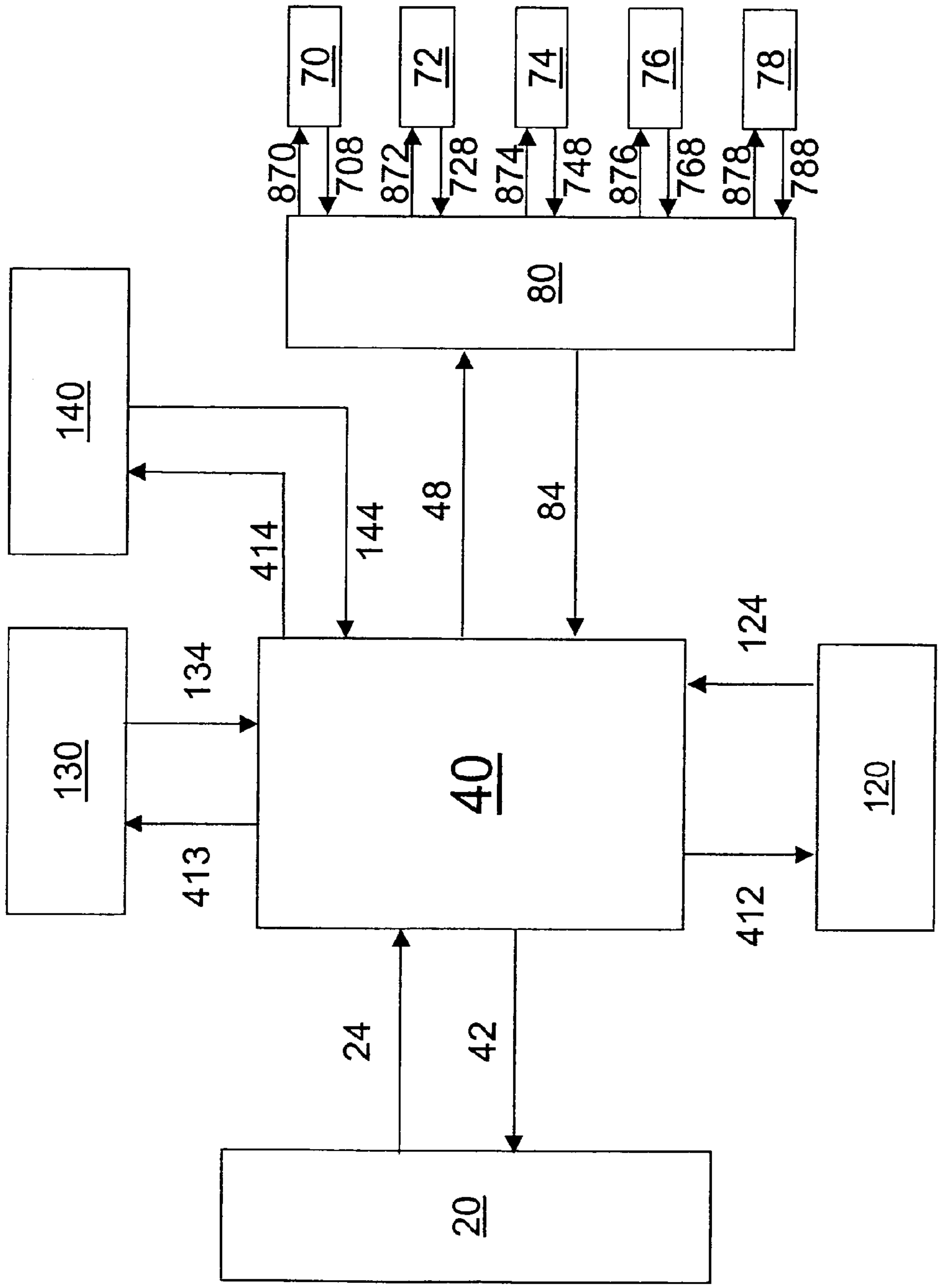

FIG. 4 shows by way of example the sequence in the vehicle 10, with the associated data exchange in the vehicle 10, in the case of the remote control of a vehicle function, namely, vehicle independent heating. FIG. 5 shows by way of example the sequence in the vehicle 10, with the associated data exchange in the vehicle 10, in the case of the remote control of a vehicle function, namely, vehicle locking. The data exchange shown schematically in FIG. 4 and FIG. 5 can occur via one or more busses and/or via discrete lines or circuits. The communication between the unit 20 and the communication unit 40 occurs via the communication unit 25, which is not shown in FIG. 4 and FIG. 5.

The data 24, which is received by the communication unit 40 from the unit 20, includes, in the example wherein the function is vehicle independent heating as shown in FIG. 4, a starting signal for starting the vehicle heater and a stop signal for stopping the vehicle heater, a time signal for setting the starting time of the vehicle independent heater and/or the signal for canceling the start time. From the vehicle 10 the following status data 42 concerning the vehicle independent heater can be transmitted via the communication unit 40 to the unit 20: status "ignition on", status "remote control of vehicle independent heater deactivated", status "energy supply insufficient", status "client programmed temperature cannot be attained by the desired time" and/or status "service activated". The data 413 transmitted from the communication device 40 to the display and operating unit 130 includes the signals shown by way of example in FIG. 4, with which the condition of the remote control of the independent heater stored most recently in the communication device 40—"activated" or "deactivated"—can be transmitted to the display and operating unit 130. The transmitted condition can be output or, as the case may be, displayed in the display and operating unit 130. The data 134 transmitted from the display and operating unit 130 to the communication unit 40 includes in the illustrated embodiment the status indications, that the user has activated or deactivated the service for remote control of the vehicle independent heater, on the display and operating unit 130. The data 144 transmitted from the instrument cluster 140, that is, the instrument control device, to the communication device include in the illustrated embodiment a signal reporting that the temperature desired by the client cannot be achieved. This content or information can be determined for example from the vehicle independent heater or the climate control and be stored in the instrument cluster or instrument combination 140, from which the signal can then be transmitted to the communication device 40. The data 410 transmitted from the communication device 40 to the vehicle independent heater 100 can include a signal for immediate activation of the vehicle independent heater, a signal for immediate deactivation of the vehicle independent heater, or a signal for programming a start time for the vehicle independent heater, or a signal for canceling the time for programming the start time for the vehicle heater. The data 140 transmitted from the vehicle independent heater 100 to the communication device 40 is optional and could include for example status data regarding the vehicle independent heater.

If the communication unit 40 receives a signal from among the possible signals of data 24 that concern the remote control of the vehicle functions, that is, the received signal includes a signal for control of vehicle functions, then the communication unit 40 transmits the inquiry 412 to the energy control device 120 in order to determine the value 124 of the actual energy reserve in the battery. This value 124 is transmitted from the energy control device 120 to the communication device 40. In the example shown in FIG. 4 the inquiry to the energy control device is carried out when the signal 24 which concerns the vehicle independent heater is received.

Using the value 124 the communication device 40 determines whether the carrying out of the vehicle function—for example heating with the vehicle independent heater—can be reconciled with the still available energy reserve. If the energy supply in storage does not suffice for carrying out the function or if upon carrying out the function the residual energy supply would drop below a predetermined threshold, then the communication unit makes the decision not to carryout the function. The unit 20 is, beyond this, informed by a status signal "energy supply insufficient" of data 42. If the stored energy supply is sufficient for carrying out the function and/or if upon carrying out the function the residual energy supply would not drop below a predetermined threshold, then the communication unit makes the decision to carry out the function. The unit 20 is, beyond this, informed by the status signal "service activated" of data 42.

The data 24, which are received by the communication unit 40 from the unit 20, include, in the example of the vehicle locking function of FIG. 5, a signal for locking the vehicle 10. From the vehicle 10 the following status data 42 concerning the vehicle locking and the unit 20 is transmitted via the communication device 40: status "ignition on", status "vehicle locking deactivated", status "energy supply insufficient" and/or status "vehicle locked". The data 413 transmitted from the communication unit 40 to the display and operation unit 130 include, in the example shown in FIG. 5, signals as to which condition of the remote control vehicle unlocking device was most recently stored in the communication unit 40—"activated" or "deactivated". The transmitted condition can then be output or, as the case may be, displayed in the display and operation unit 130. The data 134 transmitted from the display and operation unit 130 to the communication device 40 include in the illustrated example the status messages that the user has activated or deactivated the service for remote control vehicle unlocking. These messages are transmitted to the communication device 40. The data 414 is transmitted to the instrument cluster 140, that is, the instrument control device, which in the shown example includes the data 414 of the status signal that the vehicle is being operated remotely. From the instrument cluster 140, that is, the instrument control device, the data 144 are transmitted to the communication unit, in the shown example the data 144 include the status signal as to the status that the vehicle was unlocked remotely, and stored in the combination instrument 140 so that it can as needed be displayed. The data 48 transmitted from the communication unit 40 to the ignition lock control device 80 includes in the shown example of the vehicle locking function a signal for locking the vehicle. In the ignition lock device this signal is converted to signals 870, 872, 874, 876, 878. Respectively one of the signals 870, 872, 874, 876, 878 is transmitted to one of the units 70, 72, 74, 76, 78, from which respectively the locking mechanisms for the doors, the trunk lid as well as the gas tank lock, etc. are controlled. The signals 708, 728, 748, 768 and 788 are optional and can include status data of the units 70, 72, 74, 76, 78. The data 84 transmitted from the ignition lock control device 80 to the communication unit 40 is optional and can include for example status data regarding the ignition lock device.

If the communication device 40 receives a signal from among the possible signals of data 24 that concern vehicle locking, that is, a signal for control of vehicle functions, then the communication unit 40 sends an inquiry 412 to the energy control device 120, in order to determine the value 124 of the actual battery reserve or energy supply in the battery. This value 124 is transmitted from the energy control device 120 to the communication unit 40. In the example shown in FIG. 5 the inquiry to the energy control device is carried out when the signal 24 concerning vehicle locking is received.

Using the value 124 it is determined in the communication device 40 whether the carrying out of the vehicle function—in this example vehicle locking—is reconcilable with the remaining energy supply. If the energy supply in storage is not sufficient for carrying out the function, or if the carrying out of the function would cause the remaining energy supply to drop below a predetermined threshold, then the communication unit arrives at the decision not to carry out the function. The unit 20 is, beyond this, informed of the data 42 by a status signal "energy supply insufficient". If the remaining energy supply is sufficient for carrying out the function and/or if the carrying out of the function does not cause the residual energy supply to drop below a predetermined threshold, then the communication unit arrives at the decision to carry out the function. The unit 20 is, beyond this, informed of the data 42 by a status signal "vehicle locked".

The invention claimed is:

1. A vehicle data bus system (30), comprising:

a communication unit (40) for bidirectional wireless communication with at least one unit (20) outside of the vehicle (10) and with vehicle units (50, 60, 70, 72, 74, 76, 78, 80, 90, 110, 220, 130, 140) which are in data transmission communication with the communication unit (40) via at least one data bus (150, 152, 154), wherein data as to status of the vehicle units (50, 60, 70, 72, 74, 76, 78, 80, 90, 110, 120, 130, 140) is transmitted via the at least one data bus (150, 152, 154) to the communication unit (40) and transmittable via the communication unit (40) to the at least one unit (20) outside the vehicle, wherein communication between the communication unit (40) and the at least one unit (20) outside the vehicle is enabled following occurrence of a triggering event (E) and prior to expiration of a first predetermined time interval (T1) and an inactive operating mode in which the communication unit is switched off is initiated following conclusion of the first predetermined time interval (T1), wherein a second operating mode is assumed by the vehicle units (50, 60, 70, 72, 74, 76, 78, 80, 90, 110, 120, 130, 140) following the occurrence of the triggering event (E) and alter expiration of a second predetermined time interval (T2) where energy consumption is reduced in comparison to a normal operating mode, wherein the triggering event (E) is received by the vehicle units (50, 60, 70, 72, 74, 76, 78, 80, 90, 110, 120, 130, 140) via the at least one data bus (150, 152, 154), wherein the vehicle units (50, 60, 70, 72, 74, 76, 78, 80, 90, 110, 120, 130, 140) upon receipt of the triggering event (E) transmit their status data via the at least one data bus (150, 152, 154) to the communication unit (40) for storage therein during the second predetermined time interval (T2), and wherein the first predetermined time interval (T1) is longer than the second predetermined time interval (T2), during the time period after the conclusion of the second predetermined time interval (T2) and before the completion of the first predetermined time interval (T1), the communication unit (40) answers interrogation about the status of the vehicle units (50, 60, 70, 72, 74, 76, 78, 80, 90, 110, 120, 130, 140) on the basis of the status data received via the data bus (30) and stored in the communication unit (40).

2. The vehicle data bus system according to claim 1 wherein the triggering event (E) is received by the communication device (40) via the at least one data bus (150, 152, 154).

3. The vehicle data bus system according to claim 1, wherein the triggering event (E) includes an "ignition off" event, which is transmitted as a signal via the at least one data bus (150, 152, 154).

4. The vehicle data bus system according to claim 1, wherein prior to expiration of the predetermined time interval (T1) the status data stored in the communication unit (40) is transmittable to the at least one unit (20) outside of the vehicle (10) via the communication unit (40).

5. The vehicle data bus system according to claim 1, wherein the communication unit (40) is adapted to being switched, by a wakeup signal received via the data bus, from a deactivated operating mode to a mode in which communication via the communication unit (40) is possible.

6. The vehicle data bus system according to claim 1, wherein the vehicle units (50, 60, 70, 72, 74, 76, 78, 80, 90, 110, 120, 130, 140) are switchable, via a wakeup signal received via the at least one data bus (150, 152, 154), from the second operating mode into their normal operating mode.

7. The vehicle data bus system according to claim 6, wherein the wakeup signal is received by the communication signal (40) dining the first predetermined time interval (T1).

8. The vehicle data bus system according to claim 1, wherein the second predetermined time interval (T2) is significantly less than the first predetermined time interval (T1).

9. The vehicle data bus system according to claim 1, wherein stored data in the communication unit (40) for the vehicle units (50, 60, 70, 72, 74, 76, 78, 80, 90, 110, 120, 130, 140) are only accessible to the at least one unit (20) outside of the vehicle (10) via the communication unit (40) after the second predetermined time interval (T2) and during the first predetermined time interval (T1).

10. The vehicle data bus system according to claim 1, wherein the vehicle data bus system provides battery savings by preventing communication between the communication unit (40) and the at least one unit (20) outside of the vehicle (10) during a time frame outside of the predetermined time interval (T1) during the inactive operating mode and provides further battery savings by preventing communication between the communication unit (40) and the vehicle units (50, 60, 70, 72, 74, 76, 78, 80, 90, 110) 120, 130, 140) during a time frame outside of the second predetermined time interval (T2) during the second operating mode.

11. The vehicle data bus system according to claim 10, wherein the communication unit (40) and the vehicle units (50, 60, 70, 72, 74, 76, 78, 80, 90, 110, 120, 130, 140) communicate when the second operating mode is disabled.

12. The vehicle data bus system according to claim 10, wherein the communication unit (40) refrains from communicating with the vehicle units (50, 60, 70, 72, 74, 76, 78, 80, 90, 110, 120, 130, 140) during the first predetermined time interval (T1) and transmits status data of the vehicle units (50, 60, 70, 72, 74, 76, 78, 80, 90, 110, 120, 130, 140) stored in the communication unit (40) to the at least one unit (20) when the at least one unit (20) outside of the vehicle (10) makes an inquiry of the communication unit (40).

* * * * *